May 22, 1945. E. H. THOMPSON ET AL 2,376,403
ELECTRIC SELECTIVE DRINK VENDING MACHINE
Filed Feb. 16, 1940 8 Sheets-Sheet 2

INVENTORS.
Ernest H. Thompson,
Leo W. Doggett,
BY
Richard Spencer
ATTORNEY.

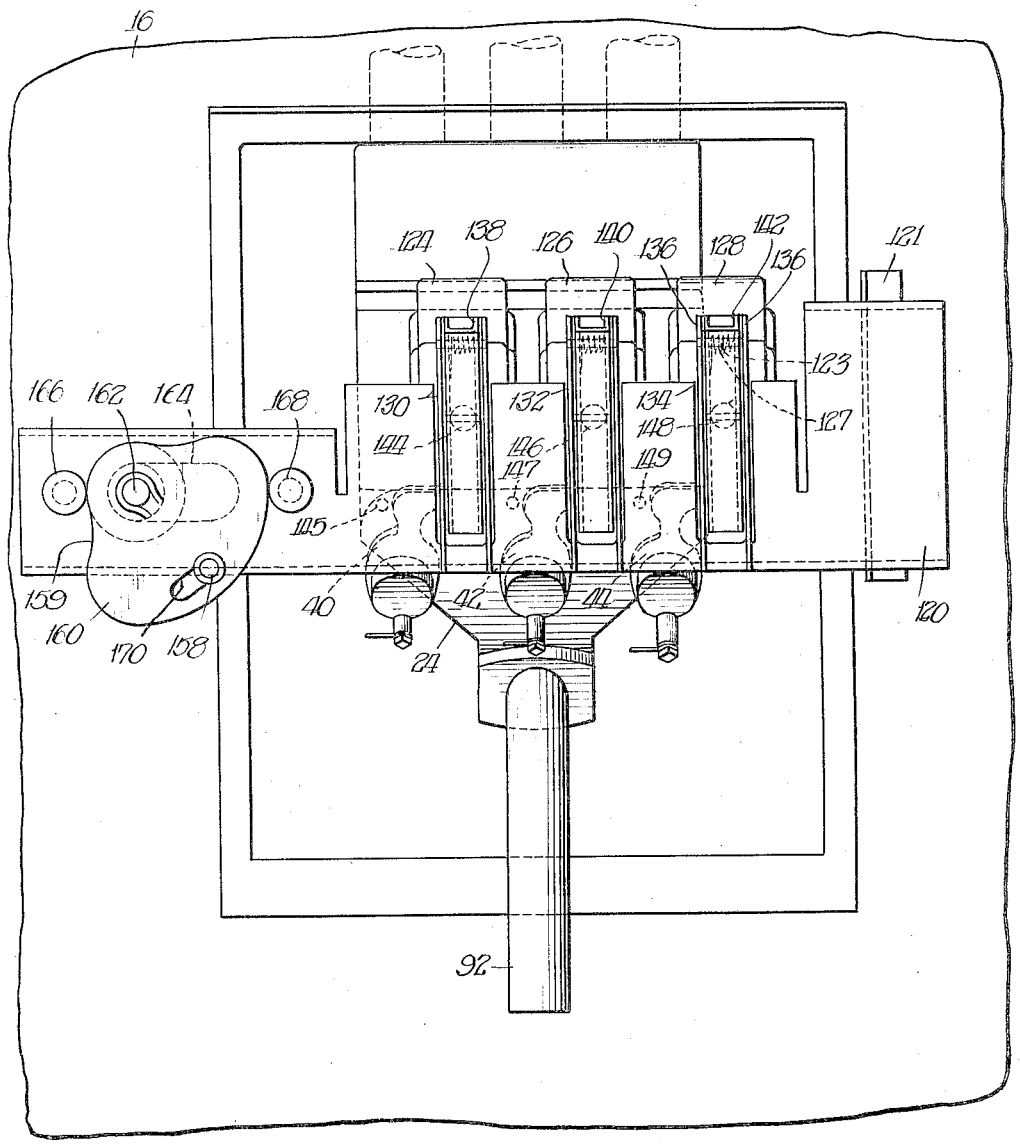

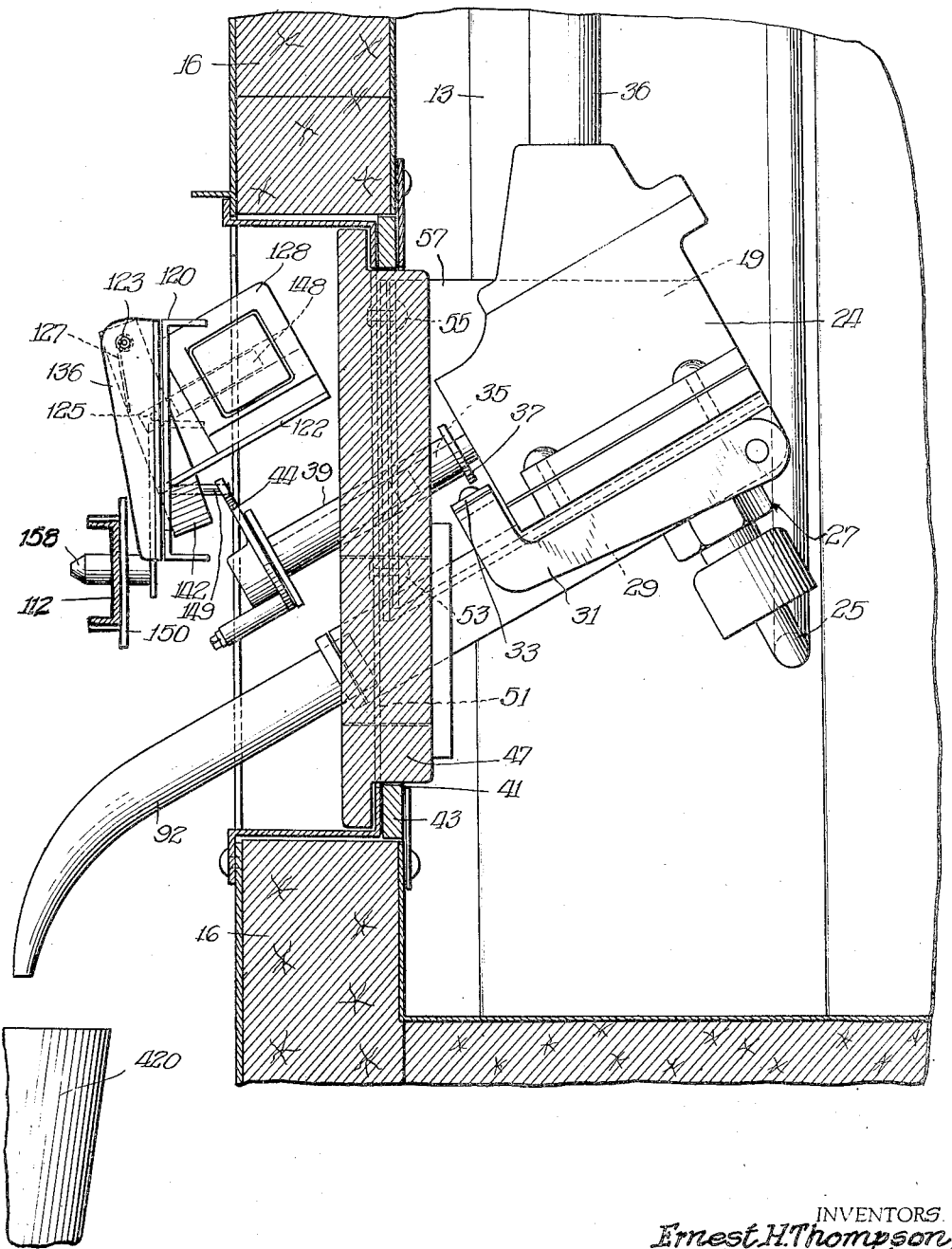

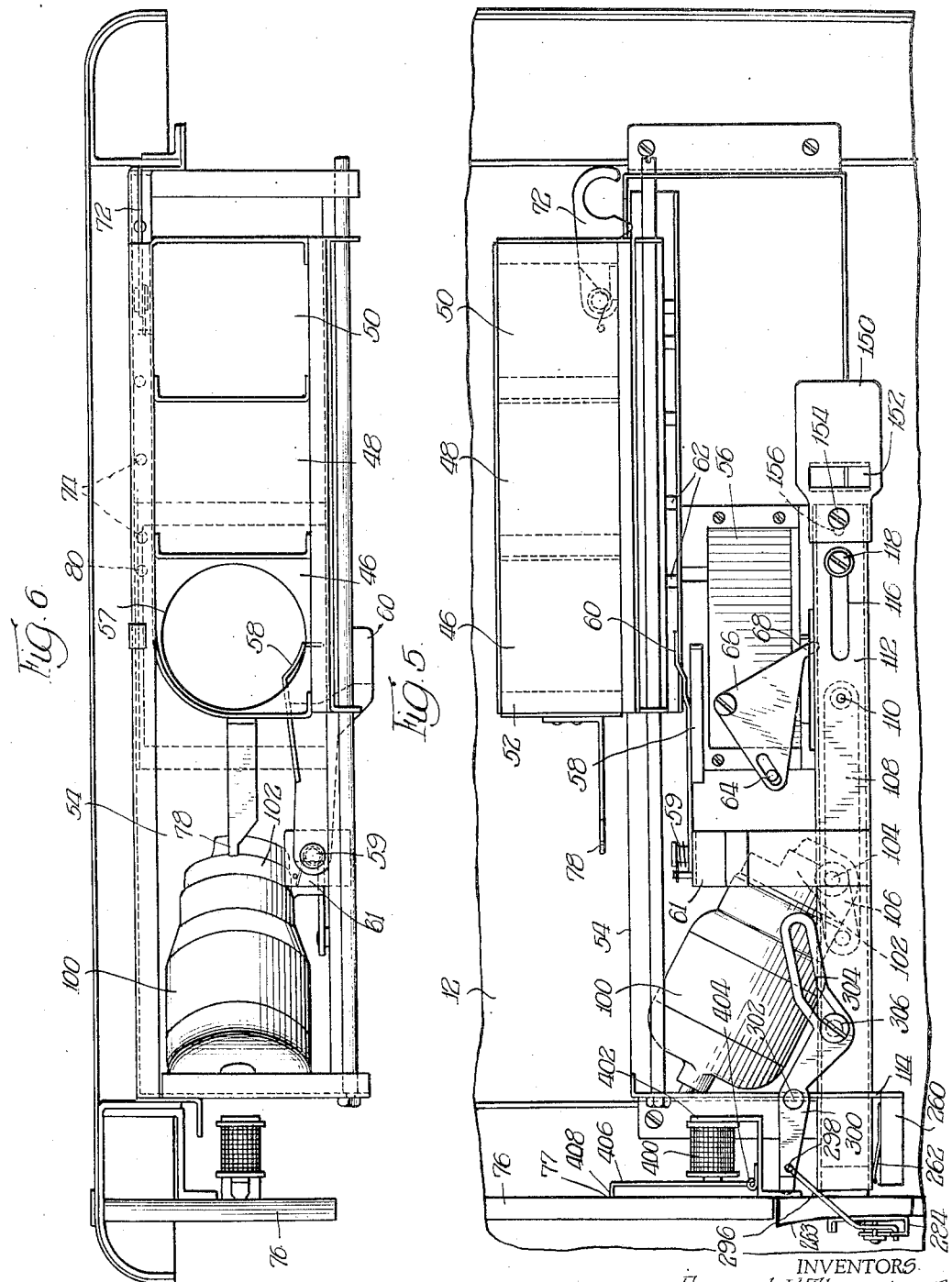

May 22, 1945.  E. H. THOMPSON ET AL  2,376,403
ELECTRIC SELECTIVE DRINK VENDING MACHINE
Filed Feb. 16, 1940  8 Sheets-Sheet 6

INVENTORS.
Ernest H Thompson,
Leo W. Doggett,
BY
Richard Spencer
ATTORNEY.

May 22, 1945.   E. H. THOMPSON ET AL   2,376,403
ELECTRIC SELECTIVE DRINK VENDING MACHINE
Filed Feb. 16, 1940   8 Sheets-Sheet 7
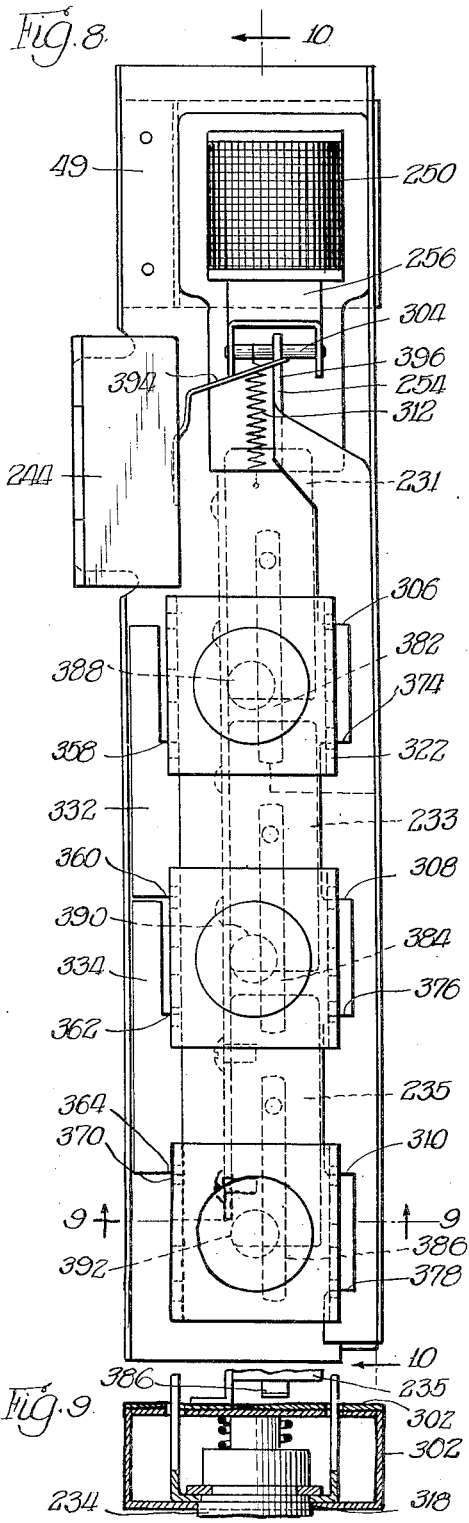
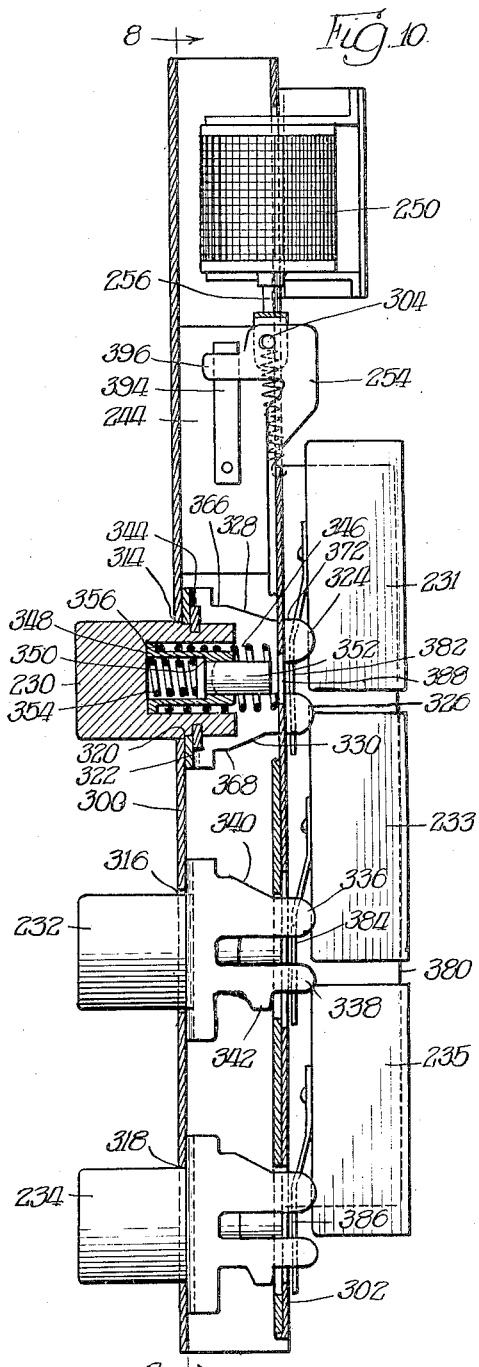
INVENTORS
Ernest H. Thompson,
Leo W. Doggett,
BY Richard Spencer
ATTORNEY.

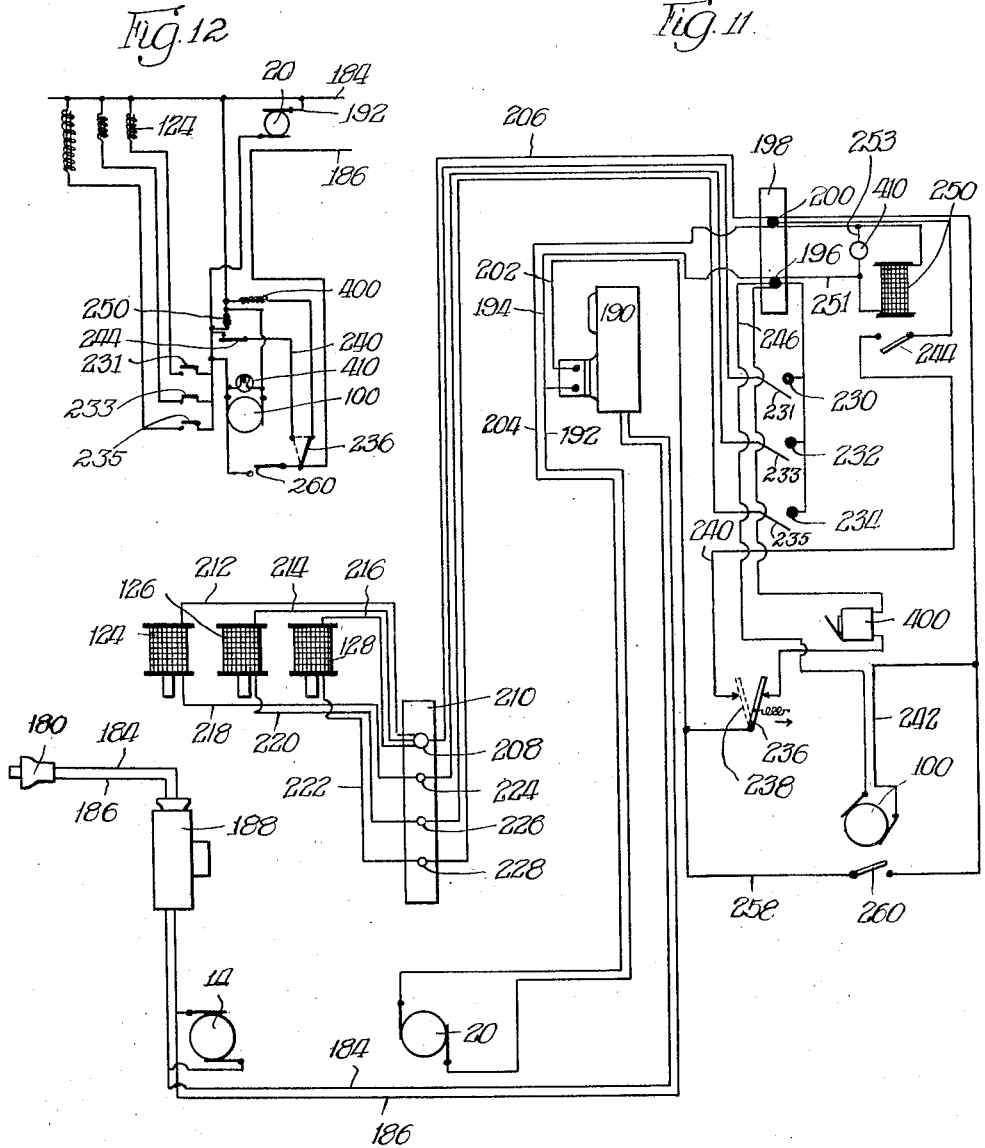

Patented May 22, 1945

2,376,403

UNITED STATES PATENT OFFICE 2,376,403

ELECTRIC SELECTIVE DRINK VENDING MACHINE

Ernest H. Thompson, Winnetka, and Leo W. Doggett, Chicago, Ill., assignors to Automatic Canteen Company of America, Chicago, Ill., a corporation of Delaware Application February 16, 1940, Serial No. 319,224

15 Claims. (Cl. 225—21)

This invention relates to drink vending machines and more particularly to coin controlled selective drink vending machines of the type wherein a beverage is prepared by the machine by mixing together the essential ingredients of the beverage such as, for example, a syrup and a carbonated water. The invention further relates to a machine of the type in which a receptacle or cup is automatically and contemporaneously or simultaneously provided for receiving the beverage. The expression "selective drink vending machine" is employed herein to describe a drink vending apparatus which offers a selection from a plurality of beverages, any one of which is automatically mixed and dispensed when a proper coin has been deposited in the machine and the desired beverage has been selected.

As is well known, there are many types of coin controlled beverage vending machines. In some types of drink vending apparatus the beverage is prepared before it is supplied to the apparatus, and hence no mixing operation by the apparatus is required. This type of apparatus is sometimes referred to as a "pre-mixed drink vending apparatus." An apparatus of this type is distinguished from the type of apparatus covered by the present invention because it involves entirely different problems and problems which are much simpler than those involved in the manufacture of a drink vending machine capable of automatically mixing the beverage from a plurality of ingredients.

The type of apparatus with which the present invention is particularly concerned also presents special problems because, among other things, it requires the automatic preparation of carbonated water by the apparatus and the retention of a high degree of carbonation in order to make the resultant drink palatable. This problem does not exist at soda fountains where space is of no consideration and large tanks are available to properly mix the carbon dioxide and water over a long period of time.

It will be apparent that a problem exists where the space is limited, as it must necessarily be in a coin controlled drink vending apparatus because ordinarily such an apparatus cannot be very large and usually should not exceed the size of a household refrigerator. In the limited space available there must be included not only means for preparing carbonated water but also means for holding the syrup or drink base from which the beverage is made, means for properly measuring the syrup, means for supplying the proper amount of carbonated water, cooling means, means for mixing the carbonated water and syrup or beverage base, and means for providing a receptacle or cup together with means for dispensing the mixed beverage into the receptacle or cup. Additionally, where there is more than one syrup or beverage base, as in accordance with the present invention, means must be provided for selecting the desired beverage. All of such means, moreover, must be capable of being operated automatically after the insertion of a proper coin into a coin mechanism associated with the apparatus. Space should also be provided to permit the disposal of used receptacles or cups within the cabinet housing the apparatus.

It will thus be apparent that the problem of dispensing a drink in a selective drink vending machine of the character herein described is relatively complicated. As a result, the machines which have been provided for this purpose are relatively complex and expensive. Furthermore, they are usually difficult to service because the mechanism and arrangement within the apparatus tend to make many parts of the apparatus inaccessible.

Unsatisfactory service or impractical construction in many types of such drink vending apparatus relates back to the source of power used in actuating the apparatus. For example, some proposed types of apparatus are actuated by means of gas pressure which may be supplied say from a carbon dioxide cylinder. Others are supplied with power from water pressure by connecting them directly to a satisfactory water supply. Still other types of such apparatus depend for their power source upon an arrangement of weights. In other types of drink vending apparatus the power is supplied mechanically from the hand of the user, that is, by pulling various levers the user may actuate certain parts of the machine, as, for example, the measuring and mixing equipment or the cup dispensing mechanism. In some types of drink vending apparatus, numerous electric motors have been used in order to operate various elements.

The types of apparatus mentioned either leave much to be desired or are impractical for one or more reasons. Thus, an apparatus which derives its power from a gas contained in a cylinder suffers from the disadvantage that the gas pressure may not be constant. That type of apparatus which must be connected to a city water supply is not very satisfactory for many locations because of the unavailability of such a water supply and also because once connected it becomes a fixture and is not readily moved. This type of apparatus also may suffer from the disadvantage of varying pressure heads, particularly where the apparatus is to be located in the upper part of a high building. When the apparatus is set to operate with one pressure it may become inoperative at another pressure.

The type of apparatus which is weight actuated is ordinarily impractical because weights are bulky and usually occupy too much space. Furthermore, the weights are usually used in conjunction with numerous levers and fulcra and a jar may unbalance the apparatus. An apparatus which is mechanically actuated by the user by means of levers which have to be pulled or pushed usually suffers from the disadvantage that there are too many moving parts and further that a substantial amount of strength is sometimes required to operate them. This type of apparatus is also unsatisfactory in many instances because it places too great a burden on the intelligence of the user. The user may pull the handle of the machine only part way and receiving no result, think that the machine is out of order, or, he may pull the handle too strenuously and cause breakage of certain parts of the machine.

In those machines in which motors have been used to operate various elements of the machine, one of the principal difficulties in the machines which are sufficiently satisfactory for commercial use is the requirement of too many motors. The use of a relatively large number of motors as, for example, five or six, results in crowding the cabinet or housing of the machine, or in making it necessary to have an unduly large cabinet, or in otherwise complicating the structure of the machine. It will be recognized that any such feature as an unduly large cabinet or a fixed connection to a city water supply interferes with the portability of the apparatus and makes it less readily movable. Furthermore, any crowding of the cabinet renders many parts or elements of the apparatus inaccessible. Accessibility and portability are both important and desirable features of selective drink vending machines of the character herein described.

With the foregoing considerations in mind, the objects of the present invention include the provision of a new and improved type of selective drink vending machine characterized by a relatively simple construction, accessibility to all of the principal elements and parts of the machine, portability as distinguished from that type of drink vending apparatus which is a fixture, and an arrangement of the elements of the machine in such a way that all of the ingredients of the drink are cooled up to the moment when they are dispensed.

A more specific object of the invention is the provision of a new and improved selective drink vending apparatus of the character described, comprising dispensing elements for dispensing cups or other receptacles and measuring and mixing elements for measuring and mixing a plurality of beverages all of which are automatically and positively actuated by a single motor.

Still a further object of the invention is the provision of an apparatus of the character described, including a cabinet with a door thereon and having the motor actuating means previously referred to mounted on the inside of the door with a cup dispensing assembly also mounted on the inside of the door and with the measuring and mixing assembly mounted in the cabinet in such a way that the motor actuates a reciprocating bar which in turn operates the cup dispensing assembly and is so arranged as to couple or engage through a single coupling with means for actuating the measuring and mixing assembly in the cabinet when the door is closed, although being disconnected from said actuating means when the door is open.

Still another object of the invention is the provision in a selective drink vending apparatus of the character described of a new and improved arrangement of solenoids to assist in selecting the particular drink to be dispensed characterized especially by the fact that the solenoids do not open and close valves themselves but bring other elements into alignment with positively controlled motor actuated means, thereby positively opening said valves in the measuring and mixing assembly.

Another object of the invention is to provide a new and improved apparatus of the character described having means to hold the apparatus in operation until a cycle of operations is completed, including the dispensing of a cup and the measuring and mixing of a beverage and insuring that only one drink will be dispensed in one cycle of operation.

Another object of the invention is to provide a novel and improved type of push button assembly in an apparatus of the character described which is instrumental not only in making the proper selection of the desired beverage, but also in insuring that a cycle of operations once started will be completed and that only one drink will be dispensed at a time.

Another object of the invention is to provide means to continue the operation of the machine in the event that there is a momentary failure of electricity and in the event that there is a complete failure of electricity to automatically return the operating elements to normal or starting position when the electrical failure is remedied.

Another object of the invention is to provide an apparatus of the character describing with means to automatically close valves in the measuring and mixing assembly in the event of a power failure.

Still another object of the invention is to provide a new and improved type of coin mechanism adaptor especially adapted to cooperate with certain elements of the apparatus.

An additional object of the invention is to provide a new and improved selective drink vending apparatus of the character described in which the selecting mechanism is controlled by a plurality of electrical circuits.

Other objects and advantages of the invention will be apparent by reference to the following description of a preferred embodiment of the invention in conjunction with the accompanying drawings, in which:

Figure 3 is a front view in elevation of the measuring and mixing assembly, including certain of the actuating elements therefor;

Figure 4 is a side view of the measuring and mixing assembly and the actuating elements shown in Figure 3;

Figure 5 is an enlarged elevational view of a portion of the mechanism mounted on the inside of the door, including the motor and the lower part of the stacks for holding the cups;

Figure 6 is a plan view of the mechanism shown in Figure 5;

Figure 8 is an enlarged rear view of the push button mechanism mounted on the door;

Figure 9 is a cross section of a push button taken along the line 9—9 of Figure 8;

Figure 10 is a side view partly in elevation and partly in cross section of the push button assembly taken along the line 10—10 of Figure 8;

Figure 11 is a diagrammatic representation of the electric circuits employed in controlling the apparatus;

Figure 12 is a schematic representation of the electric circuits.

Figure 1:
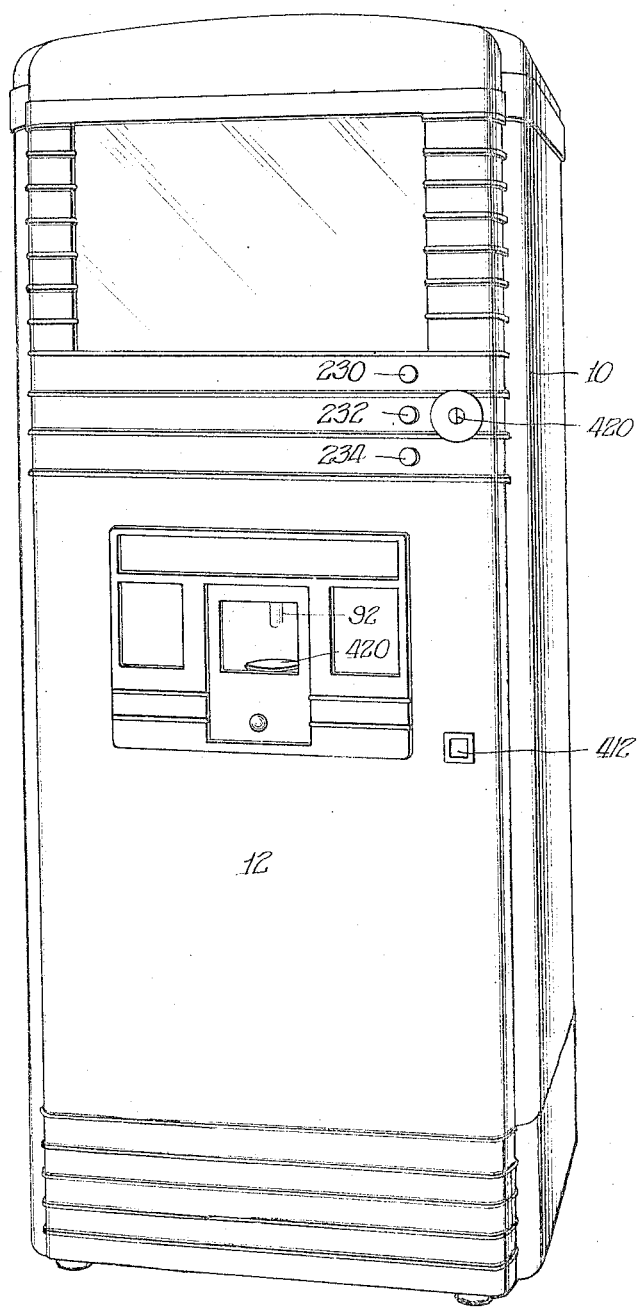
Figure 1 is a front view of the exterior of the machine.
Figure 2:
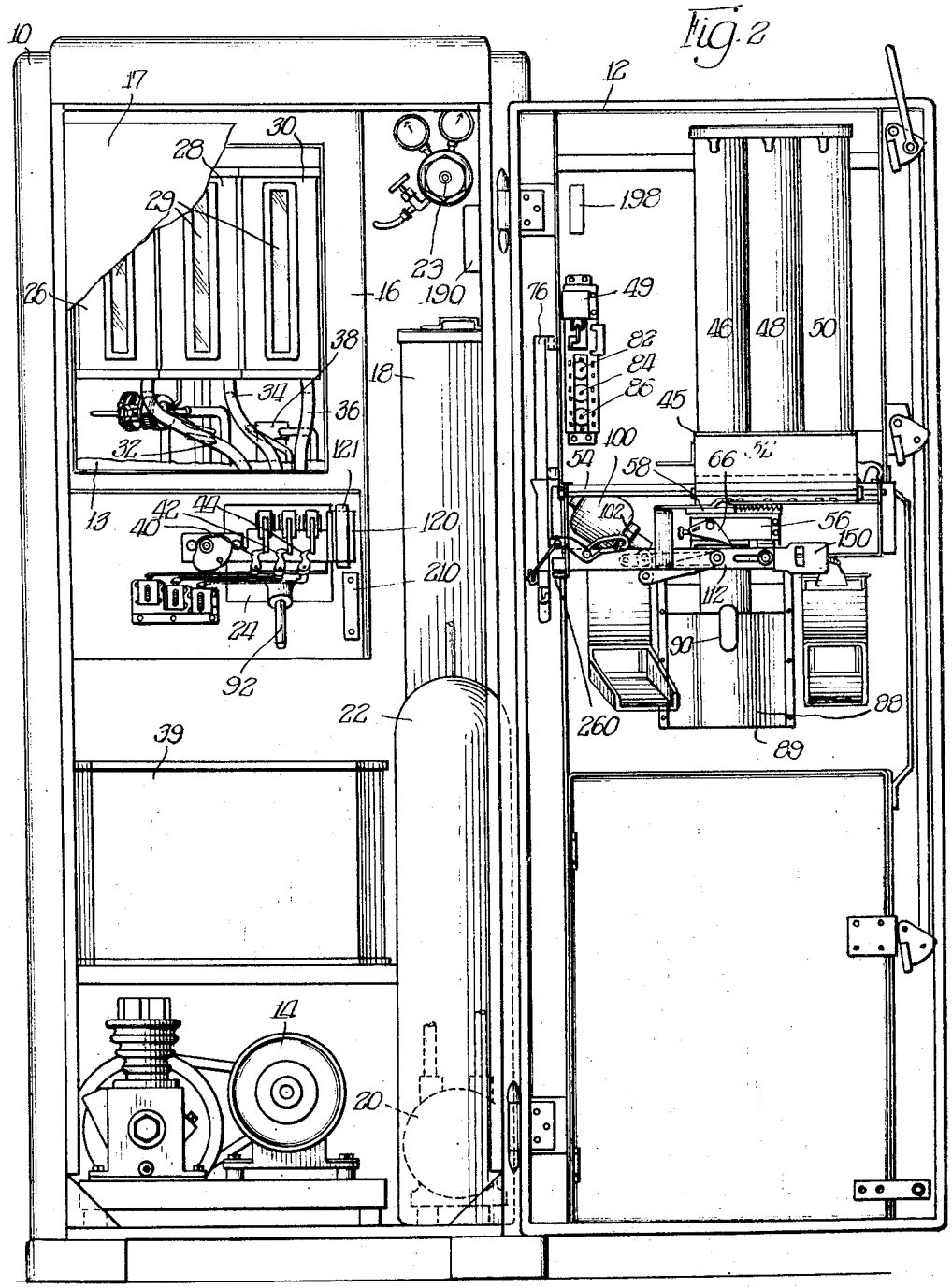
Figure 2 is a front view in elevation of the equipment mounted in the cabinet with the front door of the cabinet open.

Referring to Figures 1 and 2 the form of the invention therein illustrated comprises the following principal elements: A cabinet 10 having a front door 12; a refrigerating unit 14; an insulated cabinet 16 having an insulated door 17 shown with parts broken away; a water storage tank 18; a water pump 20; a gas cylinder 22 for holding carbon dioxide; a regulator valve 23 into which the carbon dioxide is expanded before being used to carbonate the water; a measuring and mixing assembly 24; a plurality of syrup reservoirs 26, 28 and 30 provided with windows 29 and connected to the measuring and mixing assembly through outlet lines 32, 34 and 36 (see detail in Figure 4); a preliminary cooling tank 13; a carbonator 38; a waste receptacle 39, and actuating means for the measuring and mixing assembly, including elements 40, 42 and 44; a multiple stack cup dispenser 45 mounted on door 12 of cabinet 10; a motor 100 mounted on door 12 of the cabinet 10 providing the actuating means for operating both the cup dispenser assembly 45 and the measuring and mixing assembly 24 in insulated cabinet 16; and a push button assembly 49. The more specific elements will be described hereinafter with reference to each specific feature of the invention.

For convenience the description of the various parts of the machine is divided into the following sections, namely:

(1) The syrup or beverage base supply;
(2) The water supply;
(3) The measuring and mixing assembly;
(4) The cooling means;
(5) The cup dispenser assembly;
(6) The motor actuated mechanism;
(7) The selecting mechanism, including the electrical circuits; and
(8) The coin mechanism.

It will be understood that each of the features of the machines just mentioned performs a certain function which when combined with each other function contributes to the new and improved result obtained in the construction of this machine. The invention is, therefore, based upon a new and improved combination of elements adapted to permit the selection, mixing and dispensing of a beverage in a new and simpler manner. Certain combinations and subcombinations of elements are believed to be new and useful improvements per se, quite apart from the combination as a whole. Other elements are known elements per se which when combined in the manner hereinafter described, cooperate in contributing toward improved operation of an apparatus of this type. These features of the invention will be better understood by reference to the following description.

*The syrup supply*

As shown in Figure 2, a supply of different types of syrups or drink bases is stored in containers 26, 28 and 30, respectively, and is fed by gravity through respective conduits 32, 34 and 36 to a series of measuring valves contained in the mixing and measuring assembly 24. Each syrup tank in accordance with the preferred embodiment of the invention has its own separate measuring valve. As previously indicated, the containers 26, 28 and 30 are provided with windows 29 through which the height of the syrup in each container may be clearly seen. These containers may have removable covers through which each container may be filled or the containers themselves may be removable. One of the features of the invention is that the containers are readily accessible to a service man merely by the opening of insulated door 17 of insulated cabinet 16. It will also be observed that insulated cabinet 16 is cooled in a manner hereinafter described and hence, the syrup in these containers is maintained in a cooled state. The invention, however, is not limited to any particular type of syrup container. The containers preferably employed are made of metal in order that the contents may be cooled by conduction.

*The water supply*

As previously indicated, the numeral 18 identifies a water tank which has a capacity sufficiently great to equal or to exceed the total cup capacity. By this arrangement it is not necessary to provide an empty lock for the water tank. An empty lock for the cups, being the scavenger 78, see Figure 5, hereinafter described, will protect the patron against lack of water as well as lack of cups. The water tank 18 communicates with a pump 20, for this type of vending machine does not rely upon water pressure from a city main. The reason for this is two-fold. Firstly, city water is not likely to be uniform in quality and more particularly in some large cities its chlorine content varies directly with the percentage of bacteria in the water. It has been found desirable, therefore, to utilize a purified water for the preparation of these beverages in order to avoid the dispensing of inferior drinks by the machine. Secondly, water main pressure varies as between cities and varies within cities depending upon the height of the vending machine above the pumps. This difference in pressure would be of little consequence in a machine which measures the quantity of water to be added to the syrup by means of a measuring chamber, but in a machine which measures the quantity of water by opening a water valve for a predetermined period of time, it is highly desirable to have a fixed or controlled water pressure. This is possible by employing a motor driven pump, such as 20, which will develop a certain by-pass pressure, and as will more clearly appear hereafter the various valves and equipment in the machine can be adjusted at the factory to conform to the particular pressure developed by the pump in the machine. Pumps of the quality used in these machines do not develop exactly the same pressures as between each other, but any one pump will develop the same pressure during successive periods of operation.

The water tank 18 therefore is preferably connected to the pump 20 which forces the water through precooling tank 13 and then to a carbonator 38, both located within the insulated chamber 16 as shown in Figure 2. The carbonator receives the carbon dioxide gas from a cylinder 22 through regulator valve 23 provided with a set of conventional valves and gauges which show the gas pressure and maintain a desired pressure in the line. The carbonator delivers cold carbonated water to a pipe 25, Figure 4, leading to a carbonated water valve 27 which in turn opens into mixing assembly 24.

A water pump of the type preferred may have a by-pass pressure approximating 100 pounds and during static periods this pressure will generally be the same throughout the line. Upon opening a valve such as the carbonated water valve 27 which is mounted on the delivery side of carbonator 38, the pressure in that valve may drop to sixty to seventy pounds during a period of flow. It has been found desirable to introduce the gas to the water at a pressure substantially lower than the water pressure during flow periods. It, of course, will be recognized that the gas pressure and the water pressure will vary with respect to each other depending upon the type of carbonator used. More particularly, the position of the gas and water inlets to the absorption chamber of the carbonator will effect the different pressures required to obtain a selected degree of carbonation.

In practice, the regulator valve 23 is adjusted to admit gas at a certain pressure to the carbonator by means of experimental operation. Carbonated water may be run through the system and the concentration of carbon dioxide gas determined by any suitable method. If the carbonation is too low, the gas valve would be opened in order to increase the gas pressure. No adjustments in the water line are made, for adjustment of the regulator valve 23 is alone capable of varying the concentration of gas in the carbonated water.

The measuring and mixing assembly

In machines of this type there is provided a mixing assembly which in the embodiment shown in the drawings is identified by the numeral 24, Figures 2, 3 and 4. As already indicated, mounted above the mixing assembly for gravity feed thereinto are the tanks 26, 28 and 30 which may be filled with any kind of a drink base, more commonly a syrup, and which have front windows 29 which disclose the height of the syrup in the tank. Each of these tanks drain down pipes 32, 34 and 36 into a like number of measuring valves or chambers in the mixing assembly 24. Controlling the opening and closing of each measuring valve within the mixing assembly 24 are actuating elements 40, 42 and 44. Referring to Figure 4, the lower portion of the mixing assembly 24 contains a mixing chamber 29 into which each measuring valve, indicated generally by numeral 19, opens. The carbonated water valve 27 also opens into mixing chamber 29. The carbonated water valve may be opened and closed by a lever 31 which projects forwardly of the mixing assembly 24 and carries a bar 33 extending across the front of the mixing assembly beneath a plurality of measuring valve stems 35, each of which carries a sleeve 39 supporting a cam member 37. By means of the sleeve 39 it is possible to adjust the cam member 37 relative to the measuring valve stem or shaft 35. The details of this construction are mentioned only for the purpose of assisting in understanding the operation of this machine.

One of the features of this measuring and mixing assembly is the readily removable means for supporting it within the cabinet 16 in association with a removable panel. Referring to Figure 4, it will be observed that an opening 41 has been cut through the cabinet 16. A shoulder or jamb 43 extends around the inner periphery of the opening 41 for the purpose of seating a removable panel 47. To a flange 51 is affixed by bolts 53 and 55 a bracket 57 which supports the mixing assembly as a whole. The removable panel 47 is perforated in four places to pass the three valve stems, as 35, and the spout 92. In order to mount the mixing assembly in the insulated cabinet 16, the bracket 57 is fastened to the mixing assembly 24 by any suitable means and is then mounted by means of the bolts 53 and 55 on the door jamb 43. The actuating elements 40, 42, and 44 are then removed and the insulated panel 47 slipped into position. The actuating elements are then replaced and the solenoid carried 120 is mounted in position. It will be appreciated how important this ready accessibility to the mixing assembly is when it is remembered that syrups tend to harden and clog valves which causes sluggishness in the operation of the machine and make cleaning imperative. By this arrangement it is possible to effect a cleaning of the syrup assembly on location.

The present invention is not concerned with any particular type of syrup measuring chamber or valve but a suitable type of syrup measuring valve is shown in an application by John W. Carlson, U. S. Serial No. 214,431, filed June 18, 1938, now matured into Pat. 2,272,184. This type of valve has a central longitudinally extending shaft of which shaft 35 is an extension (see Figure 4) and outwardly extending shoes which open and close inlet and outlet ports for the syrup, nor does the arrangement of a plurality of such syrup measuring valves in conjunction with a common mixing chamber corresponding to chamber 29 form a part of the present application. Such an arrangement is described and claimed in an application of John W. Carlson, Serial No. 301,528, filed October 27, 1939, now matured into U. S. Patent No. 2,261,338. It will be appreciated that other types of measuring and mixing assemblies may be employed. A feature of the present invention, however, resides in the fact that the syrup for each drink is measured quantitatively by volume while the amount of carbonated water is measured by opening valve 27 (Figure 4) for a predetermined time. The syrup flows by gravity while the pressure in the system determines the flow of the carbonated water.

The cooling means

The insulated cabinet 16 is refrigerated or cooled by means of a suitable refrigerating unit of any well known type, including a motor 14. The refrigeration is preferably accomplished by providing cooling coils around a pre-cooling unit 13 and around carbonator 38, both of which are preferably immersed in suitable conducting containers containing water. The pre-cooling unit 13 and the carbonator 38 and the means of cooling them do not in themselves form a part of this invention. A suitable carbonator is described in the patent application of John W. Carlson, Serial No. 289,767, filed August 12, 1939. The purpose of passing the water before it is carbonated through a pre-cooled tank 13 is to cool the water as much as possible. Likewise, the carbonator 38 is cooled because the cooled carbonated water preferably passes from carbonator 38 directly through conduit 25 and valve 27 to mixing chamber 29, shown in Figure 4. It will be understood, however, that different types of carbonators may be used and different methods for cooling carbonated water may be employed.

It is a feature of the invention that the same refrigerating means which serves to cool the carbonated water also serves to cool the syrup containers as well as the measuring and mixing assembly. This is made possible by having the syrup containers, the carbonation apparatus and the measuring and mixing assembly all contained within the insulated cabinet 16. In this manner all elements of the drink or beverage are precooled before, during and after mixing up until the time that the drink is actually delivered through spout 92. This increases the palatability of the drink by maintaining a high degree of carbonation up to the time that the drink is served. In addition the refrigeration is confined to a relatively minor portion of the machine. This makes it possible to employ less refrigeration and to decrease the expense or cost. It will be understood that the refrigerating unit may be controlled by thermostats or in any other suitable manner in accordance with well known practice.

The cup-dispenser assembly

The cup dispenser assembly comprises a plurality of cup magazines 46, 48 and 50 which in this case are disposed on a cup magazine carriage 52 supported by a shelf 54 mounted on door 12, as shown in Figures 2, 5 and 6. The bottom of each of the magazines 46, 48 and 50 is open so that cups placed in the magazines may rest upon the shelf. At that point in the shelf 54 immediately above a cup dispenser 56 there is a hole 57 (Figure 6) of sufficient size to permit the passage of the cups, with the result that any magazine which is brought into registry with hole 57 will permit the cups in that magazine to drop downwardly into the cup dispenser 56.

A test finger 58 mounted above the cup dispenser is provided to test the presence of cups in the space immediately above cup dispenser 56. In the event there is no cup in this space the hook member 60, which forms a part of the testing finger 58, which is pivoted at 59 on a bracket 61 fastened to the reciprocating bar 112, will be permitted to engage the aperature 62 and throw the carriage 52 toward the left so as to bring the next cup magazine into registry with the hole 57 on the shelf 54, whereby the cups in this magazine may drop into the cup dispensing device 56 and once again hold the testing finger 58, and the hook member 60, outwardly so as not to be in engagement with the apertures 62. The cup dispenser itself is actuated through a stud 64 which in turn is positively cammed into open and closed position by a lever arm 66 having a finger 68 which is so disposed relative to a bar 112 that reciprocation of the bar 112 to the right as seen in Figure 5 will move the stud 64 to the right and the return of the carriage 70 to normal will return the stud toward the left to its normal or unactuated position, there being a spring within the cup dispenser 56 which urges the stud 64 to normal position.

At one end of the cup magazine carriage 52 is a pawl 72 disposed on the carriage 52 (see Figure 5) which in cooperation with a series of holes 74 in the shelf 54 (see Figure 6) assists in maintaining a magazine in registry with the hole 57 in the shelf 54. The carriage 52 may be moved to the left by pulling it, the pawl 72 following, but it can be moved to the right only by raising the pawl 72. This latter operation is a manual operation performed by the service man when the magazines are being refilled with cups. The cup magazine and cup dispensing assembly is not described here in more detail nor referred to as one of the features of this invention because it is not a part of this invention per se. Other types of cup dispensers and magazine arrangements may be employed.

The motor actuated mechanism

One of the features of this invention is the provision of a primary source of power or motor of a size ample for actuating any equipment necessary to prepare and deliver a beverage in conjunction with a means for keying this source of power to any of several groups of valves for preparing and dispensing a selected beverage. More specifically, in order to deliver one beverage to a cup it is necessary that a cup be dropped from the cup dispenser into the recess 88 and that one of the valve actuating elements, 40, 42 or 44, see Figure 3, be actuated in order to mix a desired quantity of carbonated water with a syrup base within the mixing chamber 29 and cause the same to be discharged into the positioned cup.

This primary source of power is supplied in the embodiment of this invention shown in the drawings by an electric motor 100, shown in Figures 2, 5 and 6, which is supported on the inside of the door. A speed reducer 102 includes a shaft 104 which rotates an arm 106. At the outer end of the arm 106 is pivoted a link 108 which in turn is connected at 110 to a reciprocating bar 112. This reciprocating bar 112 is maintained in position by being passed through a hole having a configuration like the cross section of the bar 112 in the supoprting bracket 114 which is affixed to the door 12 and by means of the slot 116 in which slides a bolt 118 which is supported by other framework fastened to the door 12. Energization of the motor 100 will cause the reciprocating bar 112 to move backward and forward horizontally as viewed in Figure 5.

Having provided a positive or ample source of power, in order to complete this feature of the invention it remains necessary to provide a means for coupling this source of power to the instrumentalities for preparing and dispensing any one drink. Referring now to Figures 3 and 4, it will be observed that the measuring valve stems 35 (Figure 4) which extend forwardly from the mixing assembly 24 and terminate in actuatable elements 40, 42 and 44 are in alignment across the front of said mixing assembly 24. Mounted immediately in front of the actuatable elements 40, 42 and 44 is a solenoid carriage 120 which is disposed to reciprocate horizontally as seen in Figure 3. This solenoid carriage 120 is held in position by being passed through an aperture having a configuration like the cross section of said solenoid carriage 120 cut in a bracket 121 and by a slot 164 which rides along a stud 162 fastened to the wall of the insulated cabinet 16. Fastened to the rear of the solenoid carriage 120 is a supporting shelf 122 (Figure 4) which is so positioned relative to the mixing assembly and the elements 40, 42 and 44 so as not to interfere with the same during any reciprocating movement of the solenoid carriage 120. This shelf supports three solenoids 124, 126 and 128 (Figure 3). The solenoid carriage 120 has cut-out portions 130, 132 and 134 and at each side of the cut-out portions are brackets 136, as may best be seen in Figure 3. Each pair of brackets, 136 support a pin 123 upon which is pivoted a keying element, one for each solenoid, as 138, 140 and 142 which keying elements are held outwardly by springs such as 127. The keying elements 138, 140 and 142 are coupled near their midpoint at 125 to the cores 144, 146 and 148 of the corresponding solenoids 124, 126 and 128. A keying element in normal position may be seen in Figure 4. When a solenoid is energized, its associated keying element will be drawn inwardly into alignment with the valve actuating element 44 so that a movement of the solenoid carriage 120 toward the left, when viewed in Figure 3, will cause the keying element 142 to move the valve actuating element 44 in counter-clockwise motion, which will cause a delivery of the syrup controlled by its associated measuring valve into the mixing chamber 29 and will open the carbonated water valve 27 by means of the cam 37 on the measuring valve stem sleeve 39. In order to assure return of an actuated element as 44 to normal, a lug, as 145, 147 and 149 in Figure 3, is positioned on the rear side of the solenoid carriage 120. Each lug engages an actuated element as 44 on the return stroke with the result that the source of power 100 closes a valve as positively as it opens it.

Assuming for the moment, a connection between the bar 112 and the solenoid carriage 120, as is actually shown in Figure 4, so that reciprocating movement of the bar 112 by the motor 100 will cause a like movement of the solenoid carriage 120, it is evident that the provision of means for energiizng the motor 100 simultaneously with the energization of one of the solenoids 124, 126 and 128 will result in the delivery of a cup to filling position on the platform 89 in the recess 88 (Figure 2) and the measuring and mixing of a beverage in the mixing chamber 29 (Figure 4) with resultant delivery of the same into the cup through the spout 92 extending through aperture 90. The arrangement shown provides a positive source of power, that is, one easily able to open and close a plurality of valves and actuate a cup dispensing device. While a feature of the invention involves mounting the motor 100 on the door 12, it is apparent that the motor could be mounted in other positions and perform similar functions.

The motor and cup dispensing means have been mounted on the door in order to facilitate servicing of the machine and it is therefore necessary that means be provided for communicating the motion of the bar 112 to the solenoid carriage 120. This is effected by providing the bar 112, see Figure 5, with a plate 150 into which is cut a vertical slot 152 and which is fastened to the carriage 112 by any conventional means such as a nut and bolt 154. The plate 150 is adjustable lengthwise of the carriage 112 by means of the nut and bolt 154 and a slot 156. This capacity for adjustment is an important feature because in assemblying this equipment in cabinets exact positioning of parts is difficult and slight differences in alignment may best be compensated for by adjustable elements. As may be seen in Figure 4, the plate 150 moves to a point parallel with and adjacent to the solenoid carriage 120 when the door 12 is brought into closed position and a lug 158 which is carried by a cam member 160 (Figure 3) mounted on the solenoid carriage 120 must enter the slot 152. The position of the lug 158 is adjustable on the cam member 160 which member is pivoted on the stud 162 mounted on the insulated cabinet 16 and not interfering with the reciprocal movement of the solenoid carriage 120 because of the slot 164 which in conjunction with the stud 162 guide the solenoid carriage 120. Mounted at opposite sides of the cam track 159 of the member 160 are rollers 166 and 168 to assure movement of the carriage 120 in either direction in accordance with changes in the position of the camming member 160. It will be observed that movement of the lug 158 to the left as viewed in Figure 3 will cause the solenoid carriage 120 to move to the left and thereby generate a counter-clockwise rotation of any actuating element which is engaged by its keying member. Only one solenoid will be energized at one time.

It will also be observed that the curve surface of the cam which constitutes a segment of a circle will cause the valve to be held open for a certain length of time. The length of time that the solenoid carriage 120 will be held in open position will depend upon the position of the lug 158 in reference to the camming member 160, this relationship being capable of adjustment by means of a plurality of positions provided in a slotted portion 170 in the camming member 160. The provision of means for adjusting the lug 158 on the camming member 160 provides a quick way of compensating for irregularities in the flow of carbonated water through the valve 27 (Figure 4) due to slight differences in pressure in the carbonated water line 25 or slight differences in the amount of flow permitted by different carbonated water valves.

Summarizing, in the embodiment of this invention shown in the drawings there is provided a primary source of power together with mechanical and electrical means for connecting that source of power to any one of a plurality of valve groups and delivering one selected beverage to a cup dropped into receiving position by a cup dispenser. These steps are effected by the power driven bar 112 which actuates the cup dispenser, the solenoid carriage and a selected valve group. A feature in this assembly is the provision of adjustment means disposed between the primary source of power and any one of the valve actuating means whereby the length of time that the primary source of power will hold open any measuring valve and carbonated water valve on a single stroke may be varied and whereby registry of an actuatable element in the cabinet with the driving means on the door may be readily effected.

It will be observed that the mounting of the means for selecting a group of drink preparing and dispensing valves in the cabinet requires but one coupling between the primary source of power mounted on the door and the driven means such as the solenoid carriage 120 mounted in the cabinet. This is preferable to mounting the solenoid carriage on the door because it is easier and simpler to effect registry of one set of complementary parts than a plurality.

*The selective mechanism including the electrical circuits*

It is evident from the description that has gone before that one complete stroke of the reciprocating bar 112 when it is in engagement with the solenoid carriage 120, that is, a stroke from left to right and back to left as viewed in Figure 5 or 2 will cause the dropping of a cup into position within the recess 88 and the introduction of a desired quantity of one drink base, assuming the energization of one solenoid, and a given quantity of water to the mixing chamber 29 from which a finished beverage will be delivered into the cup. The circuits which effect this simultaneous energization of the motor 100 and one of the solenoids 124, 126 and 128 will now be described.

Referring to Figure 11, the numeral 180 identifies a conventional plug which may be inserted into any conventional wall outlet so that the lines 184 and 186 constitute the two conductors from a source of electrical supply. The supply current may be either alternating or direct but it is understood that operating elements such as motors suitable for the particular current employed will be used. These lines pass through a conventional fuse box 188 and are tapped by lines furnishing power to the motor of the refrigerating compressor 14. It will be recalled that the refrigerating unit 14 is controlled by a temperature regulator which is mounted inside the insulated cabinet 16 and is dependent in no way upon the condition of other electrical circuits in the machine. Hence, the schematic diagram in Figure 11 shows the refrigerating unit 14 connected directly to the supply lines 184 and 186. These lines 184 and 186 are carried to an outlet box 190, which may be seen in the upper righthand wall of the inside of the cabinet in Figure 2. The positioning of this outlet box is of no patentable significance, but the selected location is a convenient one.

It will be observed that in Figure 11 all circuits positioned to the right of the outlet box 190 are disposed on the door 12 and all other circuits are disposed within the cabinet 10, the result being that the disposition of operating elements in the wiring diagram in Figure 11 correspond to the actual disposition of these elements in the cabinet and on the door as shown in Figure 2 where the door is in the open position.

Into the outlet box 190 is inserted a plug having one of its lines tapped by a line 192 which leads to the pump motor 20. The tapped line 194 is connected to a post 196 on a terminal block 198, which, referring for a moment to Figure 2, is disposed on the upper left-hand portion of the door 12. A second post 200 on the terminal block 198 will be of a polarity opposite to that of the post 196, or expressed differently, the line 202 from the outlet box 190, which is of the opposite polarity of lines 192 and 194, is connected to the post 200. As this connection, however, is established through a series of circuit breaks which do not concern us at the moment it will be assumed that the post 200 is of a polarity opposite to that of the post 196. It will then be observed that the line 204 which connects the post 200 to the pump motor 20 will energize that motor in the event that the circuit is closed through the post 200. Tapped to the post 200 is a line 206 which terminates at a post 208 on a terminal block 210, which, referring for the moment to Figure 2, is disposed on the front of the insulated cabinet 16 at a point immediately below and to the right of the solenoid carriage 120. From the post 208 the line 206 is extended by three lines 212, 214 and 216 to the solenoids 124, 126 and 128 respectively. The opposite terminal posts of each of the solenoids 124, 126 and 128 are connected by lines 218, 220 and 222 through terminal posts 224, 226 and 228 respectively, on the terminal block 210, to one side of a plurality of push button switches, diagrammatically shown, 231, 233 and 235 (Figure 12) respectively, actuated by the push buttons 230, 232 and 234. The other sides of each of these push button switches are connected to the post 196.

Digressing for a moment from the functioning of these circuits, the reason for the employment of the terminal blocks 198 and 210 lies in the fact that it is necessary to permit flexing of certain wires during the operation of the machine. Thus, it will be recalled that the solenoid carriage 120, which may be seen in Figure 2, reciprocates back and forth in front of the mixing assembly 24 and provision must be made for carrying the lead-in lines to the solenoids regardless of the position of the solenoid carriage 120. Hence, referring to Figure 11, one lead-in line 206 is split into three, 212, 214 and 216, and the other lines 218, 220 and 222 are tapped to their respective posts on the terminal block 210 with the result that during any one cycle of the machine these wires will move from right to left and back, as viewed in Figure 2, with the solenoid carriage 120. Similarly, it is necessary to establish electrical connections between the outlet box 190 and the equipment mounted on the door and it is desirable to provide sufficient slack in the electric lines to permit the opening and closing of the door 12, without permitting the lines to fall indiscriminately in the cabinet. Hence, the terminal block 198 is employed.

Returning now to the description of the circuits which make it possible to simultaneously operate one of the solenoids and the primary source of power or motor 100, it will be observed in Figure 11 that the main line 202 leaving the outlet box 190 is carried down to a coin actuated switch 236 which will be described in detail later and the function of which is to close one gap in the line leading to the post 200 on the terminal block 198. For the purpose of this portion of the description it will be assumed that the coin actuated switch is in the closed position which is indicated by the dotted line 238. The line 240 leads to a solenoid controlled switch 244 which in closed position completes the connection between the line 202 and the terminal post 200. As will be explained in detail hereafter this solenoid controlled switch 244 is mechanically closed by the actuation of any one of the push buttons 230, 232 and 234 with the result that upon the actuation, that is, pressing inwardly, of, for example, the push button 230, the latter will close the switch 244 thereby completing the circuit to the terminal post 200 as well as closing the circuit to its respective solenoid, which in this case is solenoid 124. It will be observed that to the terminal post 196 is also connected a line 246 which leads to the side of the motor 100 opposite to that connected to a line 242 which connects to the post 200.

The operation of these circuits is fairly apparent from the description above. Assuming that the coin actuated switch 236 is in the closed position 238, a customer will actuate a push button such as 230 and in doing so will close the circuit between the terminal post 196 and the solenoid associated with the particular push button actuated, which in this case would be solenoid 124, and simultaneously or immediately thereafter will close the switch 244 which will complete the circuit 202 to the terminal post 200. When a connection has been established between the lines 194 and 202 with the terminal post 196 and 200 respectively, it is evident that the primary source of power, which in this case is the motor 100, will be energized through the lines 246 and 242, that the pump motor 20 will be energized through the lines 192 and 204, a holding solenoid 250 and a light 410 (both of which will be referred to hereafter) will be energized through lines 251 and 253, and assuming that the push button actuated is 230 that the solenoid 124 will be energized by the lines 212 and 218. By this arrangement there is provided a plurality of simple circuits one for each solenoid, and common lines, one to the pump motor 20 and one to the motor 100, which will be energized upon the actuation of any one of the push buttons. In short, one might say that the motor 100, the pump motor 20, the light 410, the holding solenoid 250, and any one of the solenoids 124, 126 and 128, are in parallel with respect to a circuit commencing with the poles of opposite potential 200 and 196.

Referring now to Figure 2 and assuming that the door 12 is in the closed position, the mechanical result will be that the solenoid carriage 120 will commence its movement toward the left with one of the solenoids in the dotted position 144, shown in Figure 4, with the result that the associated actuating element on one of the measuring valves in the mixing chamber assembly 24 will be moved counter-clockwise simultaneously with the dropping of a cup from a cup disperser 56, see Figure 2 or 5, into position within the recess 88 and the introduction of selected quantities of syrup and carbonated water into the mixing chamber from which a finished beverage will flow into the positioned cup.

The schematic showing in Figure 11 is not a working representation of the wiring actually employed in this machine. This wiring diagram might be described as a semi-working layout. In Figure 12 may be seen a schematic representation of the complete wiring system employed and this will be described at a later point in the disclosure. In the machines as built, the terminal block 198 is replaced by a terminal panel comprising a plurality of plug-in sockets which makes it possible to treat each of the operable elements as units having their electric circuits terminating in plugs which may readily be connected or disconnected to the terminal panel. Thus, the leads to the solenoid carriage 120 terminate in a socket which may be plugged into the terminal panel. If it is necessary to remove the solenoid carriage 120 from its position in front of the mixing assembly 24, this may be done with a minimum of interference with the wiring system. The wiring for several switches and for the entire push button assembly shown in Figures 8, 9 and 10 hereafter to be described terminates in plugs for use in connection with such a terminal panel.

In order to assure energization of the motor 100 continuously from the time that the reciprocating bar 112 commences its stroke from the position shown in Figure 5 to the time that it returns to that position, two auxiliary circuits are provided. The first of these connects the posts 200 and 196 through the windings of a holding solenoid 250 which as may be seen in Figure 11 is so disposed relative to the switch 244 that its energization will hold the switch 244 in closed position. The mechanical construction of a push button assembly which effects this relative positioning of the holding solenoid 250 and the push-buttons and which is generally identified in Figure 2 by the numeral 49 will be described in detail hereafter. For the present, suffice it to say that the actuation of any push button 230, 232 or 234 will mechanically advance a push button holding bar 254, shown in Figures 8 and 10, to a position mechanically closing the switch 244. This push button holding bar 254 is coupled at its end to a core 256 of the holding solenoid 250 the result being that upon the actuation of any one of the push buttons, the switch 244 will be closed and will energize the holding solenoid 250 which thereupon will hold the switch 244 in closed position.

Provision must now be made for opening the switch 244, for unless this is done the motor 100 would continue to operate and the reciprocating bar 112 would continue to reciprocate the solenoid carriage 120. This may be effected by restoring the switch 236 to normal or open position at a selected moment, an arrangement employed in the embodiment shown and which will be described hereafter, in conjunction with the employment of a second circuit which will be described first.

This second circuit is identified by the numeral 258 and through switch 260 connects the line 202 with the terminal post 200. This circuit is in parallel with the circuit 240 in which are the switches 236 and 244 so that when the switch 260 is closed, the circuit 258 shunts or by-passes the circuit 240. This circuit 258 performs a unique function of its own and will again be referred to. It is described at this point because the switch 260 therein may assist in stopping the operable elements of the machine at the end of one cycle or may even perform this function alone.

Describing this circuit 258 and switch 260 both mechanically and schematically, the switch 260 will be seen schematically represented in Figure 11 and actually in Figure 5 beneath the left-hand end of the reciprocating bar 112 when the latter is in normal position. It will be observed that this switch 260 has a lever arm 262 which engages the bottom edge of the reciprocating bar 112 and when such is the fact the switch 260 is in open position. When the motor 100 is energized by the closing of switches 236 and 244 the reciprocating bar 112 moves toward the right thereby clearing the arm 262 on the switch 260 and permitting that arm to move outwardly which causes this switch to assume a closed position. When in closed position, referring to Figure 11, the main line 202 is directly connected through the circuit 258 to the post 200 and the closed position of the switches 236 and 244 are no longer significant. As the reciprocating bar 112 moves on the backstroke toward its initial or normal position, it engages the switch arm 262 and thereby opens the switch 260. If at the moment when this occurs, the circuit 240 is already broken as by the opening of either or both of the switches 236 and 244, the switch 260 is the means of deenergizing the operating circuits and stopping the mechanism in normal position. As will appear hereafter the switch 244 is held closed by the holding solenoid 250 during the cycle of the machine in order primarily to hold the actuated push button of the push button assembly 49 in actuated position to maintain the functioning of an interlock. If some other type of interlock were employed, that is to say, if the means for preventing more than one button being actuated during any one cycle of the machine were not dependent upon the holding solenoid 250, the switch 244 would have to be held closed only sufficiently long for the motor 100 to advance the reciprocating bar 112 sufficiently far to close the switch 260 in shunt circuit 258, which thereafter would control the operation of the machine. Indeed, but for the interlock, the holding solenoid might be eliminated for the closing of the switch 244 by the ordinary pressing and releasing of one of the push buttons would probably energize the motor 100 for a sufficient period of time, momentarily, to move the reciprocating bar 112 far enough to close the switch 260 which would enable circuit 258 thereafter to control the operation of the machine. Under such circumstances, the condition of the switches 236 or 244 would cease to be important excepting that they must be reopened at the end of the stroke. Summarizing, the switch 260 or the switch 236 may be used as the means for opening the circuits and deenergizing the electrically operated equipment in the machine. This is effected by reopening the coin mechanism switch 236, the operation of which in conjunction with the coin mechanism and the electric circuits will be described later.

*The push button assembly*

One of the features of this invention is the provision of a new and improved assembly for holding a plurality of push buttons in assembled relationship with switches to be actuated by the push buttons. Referring for the moment to Figure 1 which shows a front perspective view of the machine, it will be noted that a plurality of push buttons are disposed in vertical alignment. In this case there are three, identified by the numerals 230, 232 and 234. These push buttons are not permanently mounted for reciprocating movement in the panel of the door 12 but are merely positioned through holes in the door 12 and held by means of an assembly which in Figure 2 is identified by the numeral 49 and which may be seen in detail in Figures 8, 9 and 10. This assembly has for a base two facing channel members 300 and 302 which support at the upper end the holding solenoid 250 having a core 256 which by means of a pin 304 is coupled to the push button holding bar 254. This push button holding arm is disposed at one side of the assembly, as may be seen in Figure 8, and its flat surface engages the surface of the channel bar 302 so that it may reciprocate thereon. The push button holding bar 254 carries a plurality of shoulders, one for each push button which in the particular embodiment of this invention number three and which are identified by the numerals 306, 308 and 310. The push button holding bar 254 is maintained in downward or normal position, which is that shown in Figure 8, with the core 256 withdrawn from the solenoid 250 by means of a spring 312. The channel member 300 is perforated at 314, 316 and 318, see Figure 10, to pass the push buttons 230, 232 and 234.

Examining for a moment the construction of one of these push buttons and referring to the upper push button 230 in Figures 8 and 10, the button itself 230 is formed of some composition product and has an annular shoulder 320 which engages the periphery of a hole in a U-shaped member 322. One of the facing walls of the U-shaped member 322 comprises the projecting members 324, 326, see Figure 10, having camming surfaces 328 and 330 for use in connection with an interlocking system composed of interlock bolts 332 and 334, which may be seen in Figure 8. The other wall of the U-shaped member 322 likewise has two projecting members 336 and 338. Referring now to the second button from the top of Figure 10, the projection 336 has a camming surface 340 while the projection 338 has a locking lug 342. It will be observed that Figure 10 is a view in elevation of the two lower push buttons taken just inside the flanges of the channel members 300 and 302, while at a point just below the third or uppermost push button, Figure 10 is a cross sectional view taken down the midpoint of the structure shown in Figure 8.

The push button head is fastened to the U-shaped member 322 by means of a C-lock washer 344. The inside face of the push button 230 is hollowed to receive a spring 346 which engages the channel member 302 and holds the push button 230, as well as the U-shaped member 322, in the outward position shown in Figure 10. Inside the spring 346 which is helical, is a sleeve 348 which has an inner shoulder 350 which prevents a plunger 352 pressed outwardly by a spring 354 from becoming disassembled with the push button 230. It will be observed that the sleeve 348 has an outer shoulder 356 upon which rests the spring 346 and this holds the sleeve 348 in assembled relationship with the button 230.

The interlocking system is extremely simple and comprises the positioning of interlock bolts 332 and 334, see Figure 8, which have shoulders 358, 360 and 362 in engagement with adjacent camming surfaces such as 328 and 330 of the projecting arms 324 and 326 of the U-shaped member 322. The interlock bolts 332 and 334 may be moved up and down, as seen in Figure 8, by a distance sufficient to pass the two projecting arms 324 and 326 at their broadest points as 366 and 368, see the upper push button in Figure 10. Inasmuch as the push button assembly 49 is vertically disposed, the interlock bolts 332 and 334 are ordinarily in their lowermost position which is indicated by the dotted line 370 in Figure 8. This position is maintained because the shoulder 364 of the interlock 334 rests upon that portion of the projection of the U-shaped member of the button 234 which corresponds with the shoulder 372 on a projecting arm 324 of the U-shaped member 322, shown on the upper button in Figure 10.

If button 234 is pressed downwardly the cam surface corresponding with 328 of the U-shaped member 322 will move freely the interlock bolts 334 and 332 and this will bring the shoulders 362 and 358, see Figure 8 into a position which will prevent the pushing of buttons 230 and 232 because the camming surface corresponding to 330 of button 230, see Figure 10, will prevent actuation of the push button. It is evident that only one push button may be actuated at a time. And, it is evident that so long as a push button is maintained in actuated position no other push button may be actuated.

It will be recalled from parts of the disclosure heretofore made that it is essential that the circuits to only one group of mixing valves be closed during the cycling of the machine and it is, therefore, necessary for this interlock to perform its function during any cycling of the machine. In consequence of this, provision is made for holding an actuated push button in actuated position during any cycle of the machine. This is effected by the lug 342 of the projecting arm 338, see the second push button in Figure 10, in conjunction with the push button holding bar 254. In addition to the shoulders 306, 308 and 310 on the push button holding bar 254 which are utilized by the camming surfaces such as 340 to move the push button holding bar into closed position, this bar 254 has shoulders 374, 376 and 378 which in the case of the actuated bush button are cammed in behind the lug 342. If for some reason the solenoid 250 is not actuated by pushing in a push button and moving the push button holding bar 254 into closed position, the spring 312 will urge the bar 254 toward normal position and in so doing the bar by shoulders 306, 308 and 310 acting upon a cam surface such as 328 will move the push button outwardly in conjunction with the force exerted by the spring 346. However, if the solenoid 250 is energized and holds the push button holding bar 254 in closed position, the push button such as 232 will not be able to move outwardly toward normal position because it is held in closed position by the lug 342. Under such circumstances the projecting arms 324 and 326, which cooperate with the interlocking bolts 332 and 334 to permit the actuation of only one button at a time, will be maintained in locked position during the entire length of time that the solenoid 250 is energized.

With reference to the positioning of the push button assembly when actually controlling switches in electric circuits, the switches 231, 233 and 235 are mounted on a bracket 380 attached to the channel member 302. Each of these switches has an actuating arm 382, 384 and 386 and each switch is so positioned that the actuating lever is mounted in registry with a hole, such as 388, 390 and 392 in the channel member 302. As may best be seen in Figure 10, at the upper push button, the hole 388 is in registry with the plunger 352 of the push button 230 with the result that the plunger 352 may pass through the hole 388 and engage the arm 382 and thereby close or open the switch 231 depending upon its type. Referring for a moment to Figure 11, it will be observed that the push buttons are identified by the numerals 230, 232 and 234. The switches 231, 233 and 235 are in the circuits controlled by the push buttons 230, 232 and 234 shown in Figure 11. The switch 244 shown in Figure 11 may be seen in Figures 8 and 10 and it will be observed that the lever arm 394 of the switch 244 is bent to engage a shoulder 396, see Figure 10, of the bar 254. The switches 231, 233, 235 and 244 are all the same type in that when their arms are in normal or unactuated position the switches are in open position and when the arms are in closed or actuated position the switches are in closed position.

With respect to the functioning of this push button assembly 49, when a customer commences to press a push button 230 the plunger 352 passes through the hole 388 and engages the lever arm 382 (Figure 10). Simultaneously the camming surface 340 is moving the push button holding bar 254 vertically, which is moving the arm 394 of the switch 244 toward closed position. The relationship between the plunger 352 and the shoulder 396 of the push button holding bar 254 is such that the arm 382 of the switch 231 will close the switch 231 before the arm 394 closes the switch 244. It will be recalled in the description of the circuits heretofore that it is desirable to have the circuit to the particular solenoid keying member closed before energy flows in any circuit. As the push button 230 is pushed inwardly, the camming surface 330 operates the interlock bolts 332 and 334 so that neither push button 232 nor 234 can be actuated. When the plunger 352 can no longer advance, a spring 354 will permit the push button 230 to continue its inward course and at some point subsequent to the closing of the switch 231 the switch 244 will be closed. Referring now to Figure 11, when the switch 244 is closed, assuming that the coin mechanism switch is in closed position, the solenoid 250, referring back to Figures 8 and 10, will be energized as will the other operating circuits with the result that the solenoid 250 will hold the push button holding bar 254 in actuated position. This will hold the switch 244 and 231 in closed position and the push button 230 in actuated position and will prevent actuation of the push buttons 232 and 234. When the solenoid is deenergized by the opening of switches 236 or 260, the spring 312, see Figure 8, snaps the push button holding bar 254 back into normal position which directly opens the switch 244 and by releasing the actuated push button 230 opens the switch 231. The assembly is now back in normal position and ready for a new cycle.

*The shunt circuit*

Referring to Figure 11, the shunt circuit 258 which upon the closing of the switch 260 establishes a direct contact between the line 202 and the terminal post 200 has been described heretofore as an alternative means of effecting the deenergization of the various circuits at the end of one cycle of the machine and has been suggested as a means for controlling the operation of the machine from a point of time when the reciprocating bar 112 has moved sufficiently far to close the switch 260. The primary function of this circuit, however, is to assure resumption of operation of the machine in the event that there should be a failure of electric current when the machine is part way through its cycle.

As is well known, electric circuits in buildings or the like are protected by the use of fuses or overload switches. In the event of an overload or some surge in the power line a fuse may be blown or an overload switch may be opened. In the case of a fuse, considerable time will elapse before it is replaced while in the case of an overload switch which snaps back into closed position, the break would be momentary. In either case, however, the break is of sufficient duration to deenergize the holding solenoid 250. If there was no shunt circuit 258, and such a failure of power occurred when the machine was in partially actuated position, there would be no circuit closed to the motor 100 and other operating elements because the holding solenoid 250 was deenergized at the time of the break and this opened the switch 244 and no means is provided for again closing the switch 244. The switch 260 of the shunt circuit 258 is closed immediately after the reciprocating bar 112 has commenced its stroke and should the machine stop at the midpoint of the stroke due to a failure of electricity, the moment the flow of current is resumed it will leave the terminal post 200 and energize the motor 100, thereby causing the machine to return to normal. Thus, it is seen that the shunt circuit 258 performs the function of assuring the return of the machine to normal after a break in the electrical supply line and a resumption of electrical current therethrough.

It might be mentioned here that if the solenoid carriage 120 were left in partially actuated position, the carbonated water valve 27 would be in open position. There would not be a flow of water through the valve after the pump motor was deenergized by the break in the electrical source of supply. There would, however, be an escape path for the carbon dioxide gas. This defect may be cured in a variety of ways, the simplest of which is the employment of a solenoid controlled valve in the gas line, not shown, in parallel with the motor 100, the water pump 20, and holding magnet 250. Such a solenoid would be energized during any operating period of the machine and while so energized would keep the gas line open. Under such circumstances if there is a failure of electricity this valve will be closed so there can be no escape of gas.

*The coin mechanism and coin mechanism switch*

Any coin mechanism suitable for determining a proper coin may be used. Since there are many such mechanisms no description of them is believed necessary.

In this invention the coin mechanism 76 preferably is mounted on the back of the door 12 (Figures 2, 5 and 6) and in its coin track there is an aperture at a position indicated by the numeral 77 in Figure 5 into which may pass a finger scavenger 78, which is affixed to the adjacent side of the cup magazine carriage 52 and which is of such a length that when the means for moving the carriage 52, after the emptying of the third magazine 50, advances the carriage to the left to a point where the pawl 72 engages the hole 80, see Figure 6, in the shelf 54, the tip of the finger scavenger 78 will penetrate the aperture at 77 in the coin track of the coin mechanism 76 and will cause any coin dropped into the mechanism at such a time to be returned to the customer.

An important feature of this invention is the provision of an auxiliary mechanism, including a switch operated by an accepted coin. This auxiliary mechanism is inserted in the coin track at a point ahead of the coin box but after the coin has been accepted by the coin mechanism proper.

Figure 7:
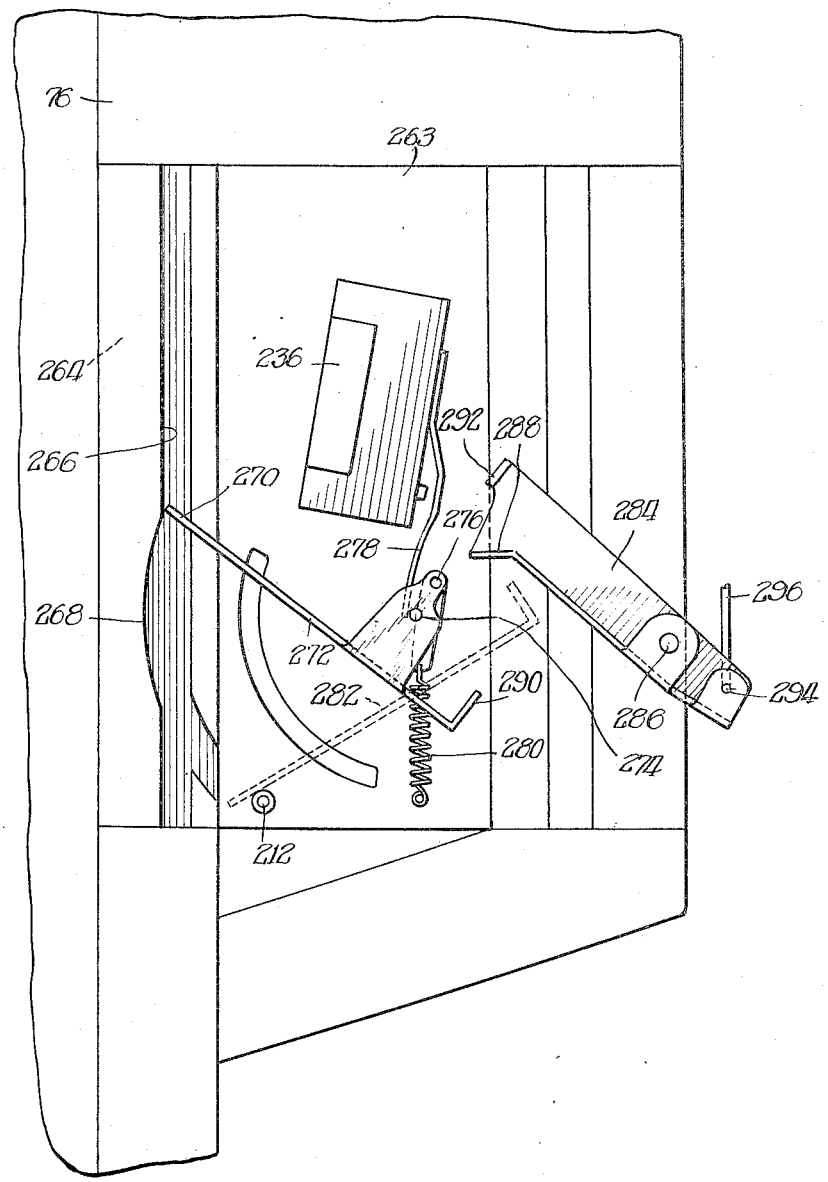
Figure 7 is a view of a portion of the coin mechanism including a coin actuated switch.

Referring to Figures 5 and 7 there appears in elevation the lower portion of the coin mechanism 76 to which is appended the auxiliary or adaptor unit 263 having a vertical coin track 264 which is positioned in registry with the outlet of the accepted coin chute of the coin mechanism 76. A slot 266 in the facing wall of the coin track has an arcuate portion 268 which permits a finger 270 on the arm 272 to penetrate the coin track 264 with the result that a coin descending the coin track 264 will move the finger 270 downward. The arm 272 is pivoted at some point such as 274 and carries a stud 276 positioned to engage an arm 278 of the switch 236 heretofore identified.

The tripping mechanism shown in Figure 7 relies upon moving the stud 276 over dead center by means of the lever arm 272 and a dropping coin. The stud 276 does not engage the switch arm 278 until after it has passed dead center and come under the influence of the spring 280 so that all the coin need do is move the stud 276 at approximately right angles to the force exerted by the spring 280 until the spring is free to act. Thereafter the spring 280 pulls the arm 272 and the stud 276 against the actuating arm 278 of the switch. The work is done by the spring. All that the weight of the coin need do is to move the stud 276 at approximately right angles to the line of force of the spring 280 for a very short distance. The finger 270 on the arm 272 need be forced down about a half inch or less in order to bring the spring 280 into operating position. The impact of a falling coin is sufficient to effect this.

The descent of the coin down the coin track 264 will rotate the arm 272 in a counter-clockwise direction about its pivot 274 bringing into operation a spring 280 which holds the arm 278 of the switch 236 in closed position. It will be understood that this occurs at the time that a customer drops an acceptable coin into the coin mechanism.

Assuming that the arm 272 has been moved downward by the combined action of a coin and the spring 280 it will assume the position shown by the dotted line 282. At a point to the right of the arm 272 is a lever 284 pivoted on the adaptor 263 at 286. This lever carries at one end a projection 288 which on a counter-clockwise motion of the lever 284 will engage a projection 290 on the arm 272 so that the lever 284 may restore the arm 272 to normal or unactuated position which is that shown in Figure 7. The lever 284 also carries a projection 292 turned at right angles to the length of the lever 284 and adapted to engage the arm 278 of the coin mechanism switch 236 and hold it in closed or actuated position. Hooked into the outer end of the lever 284 at 294 is a link 296 which is bent, referring now to Figure 5, to engage a hole 298 in a bell crank 300 which is pivoted at 302 on a stub shaft mounted on the supporting bracket 114. At the other end of the bell crank lever 300 is an internal cam 304 in which rides a stud 306 mounted on the reciprocating bar 112.

This means for returning the switch 236 to open position operates in the following fashion. As the reciprocating bar 112 moves to the right the bell crank lever 300 is cammed in clockwise direction which raises the link 296 and causes the projection 288 of the lever 284 to engage the projection 290 of the lever 272, which because of the earlier dropping of a coin is in the dotted position 282, and cause the lever 272 to move toward normal position. The projection 292 engages the arm 278 and holds the switch 236 in closed position while the stud 276 on the lever 272 is moving away from the arm 278. When the reciprocating bar 112 has reached the outer limit of its stroke, the lever 272, see Figure 7, will have been returned to normal. As the reciprocating bar 112 moves back toward normal position, the lever 284, see Figure 7, moves in a clockwise direction about the pivot 286, the projection 292 holds the arm 278 of the switch 260 in closed position until some point just prior to the end of the stroke. This point may occur before, see Figure 5, the reciprocating arm 112 opens the switch 260.

Summarizing the operation of the means for holding the circuits in closed position during one stroke of the reciprocating bar 112, there is provided a mechanical means such as the push button holding bar 254 responsive to actuation of any one of the push buttons for closing a switch 244 in the circuit 240. If at the time that the switch 244 is closed a coin has thrown the switch 236 into closed position, all of the circuits necessary for actuating the elements for preparing and dispensing the beverage indicated by the push button actuated, will be energized, and more particularly the motor 100 will commerce to move the reciprocating bar 112 to the right as viewed in Figure 5. As this occurs the lever 284, see Figure 7, will move in a counter-clockwise direction. restoring during such movement the lever 272 while simultaneously holding the switch 236 in closed position. During the same time, the switch 260, see Figures 5 and 11, will be closed and this will assure operation of the motor 100 regardless of the condition of the switches 236 and 244. At some point prior to the termination of the stroke of the reciprocating bar 112, the lever 284, see Figure 7, will, by means of its projection 292, release the arm 278 (Figure 7) of the switch 236 which will return to normal or open position. As explained heretofore this may occur prior to or subsequent to the opening of the switch 260 but it is preferable in the device shown to open the switch 236 before the switch 260 is open. In this event the switch 260 performs the important function of opening the circuits to stop the machine.

The return coin solenoid

It will be understood that during the cycling of a machine of this type, a user must not be permitted to interfere. One thing a user might do would be the dropping of an acceptable coin in the coin mechanism during such time. If this occurred at the moment just prior to the deenergization of the solenoid 250, the solenoid 250 would continue energized and would cause the machine to cycle again. The patron, however, would not have been able to press a button because the button previously actuated would be held in closed position. In order to obviate this difficulty, there is provided a solenoid 400 which may best be seen in Figure 5. This solenoid is mounted on a bracket 402 which in turn is fastened to the coin mechanism 76. Pivoted at 404 on the bracket 402 is an arm 406 having a finger 408 which penetrates a hole in the wall of the coin mechanism 76. This hole is adjacent to the coin track in the coin mechanism 76. When the solenoid 400 is energized the arm 406 is drawn toward the solenoid and is in the position shown in Figure 5. This will be referred to as normal position for normally the solenoid 400 is energized. This statement may most easily be substantiated by referring to Figure 12 where the solenoid 400 is seen to be in a circuit which connects the post 196 to the switch 236. It will be observed that the switch 236, which heretofore has been treated as a single switch, is in reality a double switch. In its normal position, which has heretofore been referred to as off, it closes the line 202 through the solenoid 400 to the post 196. When the switch 236 is thrown into closed position, that is the dotted position 238 shown in Figure 11, the solenoid 400 is deenergized, referring to Figure 5, the arm 406 pivots counterclockwise on the point 404 and the finger 408 enters the coin track of the coin mechanism 76. The result is that immediately after a coin has thrown the switch 236 into closed position the finger 408 has entered the coin track and will prevent the dropping of another coin throwing the switch 236 until the switch 236 is returned to normal position and the solenoid 400 is again energized.

Schematic diagram of wiring

In Figure 12 one may see a simplified wiring scheme wherein the lead-in line 186 leads directly to the coin mechanism switch 236. In normal position the current continues to the return coin solenoid 400 and back to the other line 184. In the event that the coin mechanism switch 236 is closed by the passage of a coin, it assumes the dotted position and energizes the circuit 240. Upon mechanically closing the circuit 240 at the switch 244 and the switch, such as 231, which is mechanically accomplished by the push button assembly shown in Figures 8 and 10, the holding solenoid 250 is energized, the coin return solenoid 400 is deenergized, and current flows to an electric light 410, which is not shown in the drawings but which is within the recess 88, to the motor 100, to the pump motor 20 and to the associated solenoid 124 on the solenoid carriage 120. After the motor 100 has advanced the carriage 112 for a short distance, the shunt switch 260 is closed and this renders unimportant the closed position of the switch 236 by itself holding the switch 244 in closed position. Mechanically the switch 236 and the switch 260 are returned to normal or open position at the end of the stroke of the machine, causing the energization of the coin return solenoid 400 and the deenergization of the holding solenoid 250 and of all operating circuits.

It will be observed that by this arrangement a holding solenoid 250 is able to maintain certain operating circuits which may be described as common circuits for the preparation and dispensing of any drink in closed position while holding a selective circuit, which enables the machine to prepare and dispense a selected drink, simultaneously in closed position.

Operation of the machine

One cycle of the machine will be described in detail. When a user approaches the machine it will present the appearance shown in Figure 1. Without depositing a coin he may do several things, none of which will interfere with the operability of the machine. He may press in any one of the push buttons and in so doing he will close the associated switch such as 231, see Figure 10, and the switch 244, see Figure 8, but nothing will happen because the lines are not energized due to the fact that the coin mechanism switch 236 is in open position. By pressing one button he will bring the interlocking bolts 332 and 334, see Figure 8, into position so that he cannot simultaneously press either of the other push buttons. Because of the fact that the solenoid 250 is unenergized, the spring 312 in conjunction with the spring 346 in each push button will constantly urge all units of the assembly back toward normal position. The customer may further open a door into the recess 88 but he will not be able to reach the cups in the cup dispenser 56 because they are out of reach.

Having satisfied himself that he cannot disturb the normal condition of the machine, the customer may now drop a coin into the coin slot 420. If the coin is not acceptable, the coin mechanism 76 will return it to the customer by dropping it into the return cup 412. If the coin is acceptable, the coin will pass through the coin mechanism into the coin track 264 and the adaptor 263, which may be seen in Figure 7. Descending the coin track 264 the coin strikes the finger 270 of the arm 272 and as described before closes the switch 236. This energizes the circuit 240, see Figure 11, as far as the switch 244. If at the time he drops a coin, the customer is holding a push button in closed position, the associated switch 231 and the switch 244 will be in closed position so that the closing of the coin mechanism switch 236 will immediately energize the holding solenoid 250. On the other hand if the customer is not holding a push button in actuated position nothing happens. He may now press such a button. If, referring to Figure 10, he presses a push button sufficiently far to close the switch 231 but not to close the switch 244, he may release the push button for it is the closing of the switch 244 which energizes the solenoid 250. If he pushes the button sufficiently far to close the switch 244 and energize the solenoid 250 nothing that he may now do can stop the machine from performing one complete cycle. He may attempt to pull the actuated button outwardly but, referring to the second button in Figure 10, the lug 342 will be caught over the shoulder 376 of the push button holding bar 254 which is being held by the solenoid 250 and hence the button cannot be withdrawn. The customer might think he could affect the condition of the machine by dropping another coin into the coin mechanism 76 but this coin would be returned to him because the coin return solenoid 400 was deenergized the moment the switch 236 was thrown and this permitted the finger 408, see Figure 5, to penetrate the coin track of the coin mechanism 76 and intercept any coin dropped. A light 410 turned on at the moment when the switch 244 was closed.

The machine now commences its cycle free from interference by the customer. Referring to Figures 3 and 4 the solenoid, which for this cycle will be assumed to be 128, will be energized the moment the switch 244 is thrown and will assume the dotted position 144, see Figure 4, in alignment with the actuating element 44 on the measuring valve stem 35. The motor 100 is energized and, referring to Figure 5, moves the reciprocating bar 112 toward the right. The lever 66 on the side of the cup dispenser 56 is moved in a counter-clockwise direction and a cup is dropped into position in the recess 88. Riding in the slot 152 is the lug 158, see Figure 4, which is mounted in a cam member 160, see Figure 3. The effect of this coupling is to cause the solenoid carriage 120 to move in exactly the same fashion as the reciprocating bar 112. As the solenoid carriage 120 moves to the left, as viewed in Figure 3, the keying member 142, see Figure 4, engages the actuating element 44 and moves the latter in a counter-clockwise direction. In so doing, a measuring valve 19 within the mixing assembly 24 is opened so that the syrup will drop into the mixing chamber 29. Simultaneously, by means of the camming element 37 the bar 33 and the arm 31, the carbonated water valve 27 will be opened and permit a flow of carbonated water under pressure into the mixing chamber 29 where a mixing of the syrup and the water is effected. A finished drink will descend by gravity through the spout 92 and enter the cup 420 which is shown in position.

While the reciprocating bar 112, see Figure 5, is moving toward the right, the lever 300 through the link 296 and the arm 284, see Figure 7, is restoring the arm 272 to normal position while the projection 292 holds the switch 236 in closed position. At the beginning of its stroke the reciprocating bar 112 cleared the arm 262 of the switch 260 which is mounted in the shunt circuit 258, thereby closing that circuit. The shunt circuit is reopened when the reciprocating bar 112 returns to normal position.

When the bar 112 reaches normal position, the switch 236 is opened which again energizes the coin return solenoid 400 which in turn draws the finger 408 out of the coin track of the coin mechanism 76 and permits an acceptable coin to pass through the coin mechanism and down the track 264 of the coin adaptor 263. When the solenoid 250 is deenergized the push button holding bar 254 is returned to normal position by the spring 312 which releases the actuated push button. Referring to Figures 3 and 4, the actuated element, as for example 44, will have returned to normal position and in so doing the lug 149 will have closed the carbonated water valve 27 and the syrup measuring valve 19 which will refill with syrup from its tank above.

Having thus described the invention, what we claim as new and desire to secure by Letters Patent of the United States is:

1. In a selective beverage vending apparatus of the character described, a plurality of supply means for beverage ingredients capable of being mixed to form a plurality of different beverages, a mixing means, valves to control the introduction of said beverage ingredients into said mixing means from said supply means, motive means comprising an electric motor, valve actuating means driven by said motive means, electric selective keying means for connecting said valve actuating means to selected valves thereby causing the opening of said valves and the introduction of the selected beverage ingredients into the mixing means to be admixed, and means responsive to the actuation of an external control for closing a circuit through said electric motor and one of said electric selective keying means.

2. In a selective beverage vending apparatus of the character described, a plurality of supply means for beverage ingredients capable of being mixed to form a plurality of different beverages, mixing control means for controlling the mixing of any one of said beverages, motive means for actuating said control means through a cycle of operation to prepare one of said beverages, said motive means being normally out of operative engagement with said mixing control means, external controls responsive to the choice of the user to select a desired beverage, electric selective keying means actuated by said external controls for connecting said motive means to said mixing control means, and means including an electrical circuit for causing said motive means when once started to complete a cycle of operation irrespective of any attempted actuation of said manually operated means.

3. In a selective beverage vending apparatus of the character described, a plurality of beverage ingredient supply means capable of being mixed to form a plurality of different beverages, means comprising an electric motor controlled by an electric circuit to perform a cycle of operations in mixing said beverages, a second electric circuit in parallel with the first circuit to cause the operating cycle once started to be resumed after a power failure, a plurality of external controls responsive to the choice of the user to select a desired beverage and means responsive to the actuation of any one of said external controls for closing said circuit through said motor to cause the mixing of a selected beverage.

4. In a selective beverage vending apparatus, a plurality of supply means for beverage ingredients capable of being mixed to form a plurality of different beverages, valves to control the introduction of said beverage ingredients into a suitable mixing zone from said supply means, a cup dispenser adapted when actuated to dispense a cup to receive the beverage, motor actuated means normally connected to actuating elements for actuating said cup dispenser but out of operative engagement with said valves, and electric selective keying means responsive to the choice of the user for connecting said motor actuated means to selected valves thereby causing a cup to be dispensed and a selected beverage to be prepared.

5. In a selective beverage vending apparatus, a plurality of supply means for beverage ingredients capable of being mixed to form a plurality of different beverages, valves to control the introduction of said beverage ingredients into a suitable mixing zone from said supply means, a pump to supply pressure on a beverage ingredient prior to the time that said ingredient is passed to the mixing zone, a cup dispenser adapted when actuated to dispense a cup to receive the beverage, motor actuated means connected to actuating elements for actuating said cup dispenser but unconnected with said valves, electric selective keying means responsive to the choice of the user for connecting said motor actuated means to selected valves, and means to cause said pump and said motor actuated means to be actuated simultaneously with the actuation of said electric selective means thereby causing a cup to be dispensed and a selected beverage to be prepared.

6. A drink vending machine of the character described comprising, a plurality of syrup supply reservoirs, a carbonated water supply, a plurality of measuring valves each for controlling the introduction of syrups from said supply reservoirs into a suitable mixing zone, a carbonated water valve responsive to each syrup measuring valve and controlling the flow of carbonated water to said mixing zone, a pump for providing pressure to the carbonated water, motive means for opening a selected measuring valve, and means responsive to a source of electrical energy for energizing said pump and said motive means simultaneously with the holding open of one of said syrup valves and the carbonated water valve during a predetermined time interval.

7. A coin operated drink vending machine of the character described comprising a plurality of syrup supply reservoirs, a carbonated water supply, a like plurality of valves to control the introduction of syrup into a suitable mixing zone, a carbonated water valve actuated by each syrup valve, and electrical means for operating said syrup valves, said electrical means comprising a motor and a plurality of electrically actuated keying elements, one for each syrup valve in a like plurality of circuits controlled by a like number of external controls, and automatic means for opening any closed circuit at the end of a mixing operation irrespective of the external controls.

8. In a selective beverage vending apparatus of the character described, a plurality of supply means for beverage ingredients capable of being mixed to form a plurality of different beverages, valves to control the introduction of said beverage ingredients into a suitable mixing zone from said supply means, actuating elements for opening and closing selected valves, motor actuated means normally out of operative engagement with said actuating elements and electric selective means, including a plurality of electro-magnets for bringing said motor actuated means into operative engagement with said valve actuating elements thereby causing the opening of said valves and the introduction of selected beverage ingredients into the mixing zone.

9. In a selective beverage vending apparatus of the character described, a cabinet with a door thereon, a motor mounted on the door, a cup dispensing assembly also mounted on the inside of said door, a plurality of supply means for beverage ingredients capable of being mixed to form a plurality of different beverages and a measuring and mixing assembly mounted in said cabinet, motor actuated means connected to said motor for actuating said cup dispensing assembly, means connected to said motor actuated means for coupling through a single coupling with means for actuating the measuring and mixing assembly in the cabinet when the door is closed and adapted to disconnect from said measuring and mixing assembly actuating means when the door is open.

10. A drink vending machine of the character described comprising, a plurality of syrup supply reservoirs, a valve controlling carbonated water under pressure, means for introducing a measured quantity of a selected syrup into a suitable mixing zone and electrical means for holding open said carbonated water valve for a predetermined period of time; said electrical means comprising a reciprocating member driven by a motor in a circuit opened by a switch each time the reciprocating member returns to normal position.

11. In drink vending machines of the character described, a plurality of external controls, and an electric circuit and electrically driven means associated with each external control for preparing and dispensing a beverage, said external controls comprising a plurality of push button camming means each disposed to advance a holding bar toward a holding solenoid positioned in a circuit which is energized by actuation of each external control and an interlocking means actuated by said push buttons whereby only one push button may be actuated at one time.

12. In a selective beverage vending apparatus, a plurality of syrup supply reservoirs, a carbonated water supply, a control valve for each syrup supply reservoir to control the flow of said syrup to a suitable mixing means, a control valve for the carbonated water supply to control the flow of carbonated water to a mixing means where it is mixed with said syrup, means operatively associated with each of said syrup control valves and energized by a source of electrical energy responsive to an external control for opening said associated valves, means operatively associated with the carbonated water valve for opening said valve for a predetermined time interval simultaneously with the opening of any one of said syrup control valves, a cup dispenser, actuating elements operatively associated with said cup dispenser and energized by said source of electrical energy and means for causing said cup dispenser actuating elements to be actuated prior to the opening of any of said control valves.

13. In a selective beverage vending apparatus, a plurality of supply means for beverage ingredients capable of being mixed to form a plurality of different beverages, a mixing means, valves to control the introduction of said ingredients into said mixing means from said supply means, a reciprocable carriage adjacent said valves, valve actuating means on said carriage normally out of engagement with said valves, said actuating means being capable of movement into the path of a selected valve in response to a source of electrical energy, whereby reciprocation of said carriage will open one of said valves.

14. In a beverage vending machine, a plurality of supply means for beverage ingredients capable of being mixed to form a plurality of different beverages, mixing control means for controlling the mixing of any one of said beverages, an electric motor for actuating said control means through a cycle of operation to prepare one of said beverages, an electrical circuit controlling the operation of said motor, a plurality of external controls one for each beverage, means for closing said electric motor circuit to a source of electrical energy in response to the actuation of any one of said external controls, electrically operated connecting means for connecting said motor to predetermined mixing control means, an electrical circuit controlling said electrically operated connecting means, and circuit closing means in said electrically operated connecting means control circuit responsive to the actuation of predetermined external controls thereby to connect said motor to said predetermined mixing control means upon the actuation of a selected external control and simultaneously to close said motor circuit to initiate a cycle of operation.

15. In a beverage vending machine, a plurality of supply means for beverage ingredients capable of being mixed to form a plurality of different beverages, mixing control means for controlling the mixing of any one of said beverages, electrical actuating means for actuating said control means through a cycle of operation to prepare one of said beverages, a plurality of electrical control circuits for said electrical actuating means one for each beverage, an external control corresponding to each of said control circuits and operative when actuated to close its associated circuit, thereby to initiate a cycle of operation for the preparation of a selected beverage, and means to cause said cycle of operation when once started to be completed irrespective of any actuation of any of the external controls.

ERNEST H. THOMPSON.
LEO W. DOGGETT.

CERTIFICATE OF CORRECTION.

Patent No. 2,376,403.     May 22, 1945.

ERNEST H. THOMPSON, ET AL.

It is hereby certified that error appears in the printed specification of the above numbered patent requiring correction as follows: Page 4, second column, line 19, for "carried" read --carriage--; line 33, for "Pat." read --U. S. Pat.--; page 5, first column, line 51, for "aperature" read --aperture--; and second column, line 40, for "supoprting" read --supporting--; page 6, first column, line 35, for "energiizng" read --energizing--; and second column, line 70, for "Figure" read --Figures--; page 11, second column, line 63, for "commerce" read --commence--; page 12, second column, line 52, for "and the" read --of the--; and that the said Letters Patent should be read with this correction therein that the same may conform to the record of the case in the Patent Office.

Signed and sealed this 2nd day of October, A. D. 1945.

Leslie Frazer (Seal)      First Assistant Commissioner of Patents.